Oct. 17, 1939.  A. E. ZAMBARANO  2,176,286
HAND WINDING REEL
Filed May 17, 1937  2 Sheets-Sheet 1
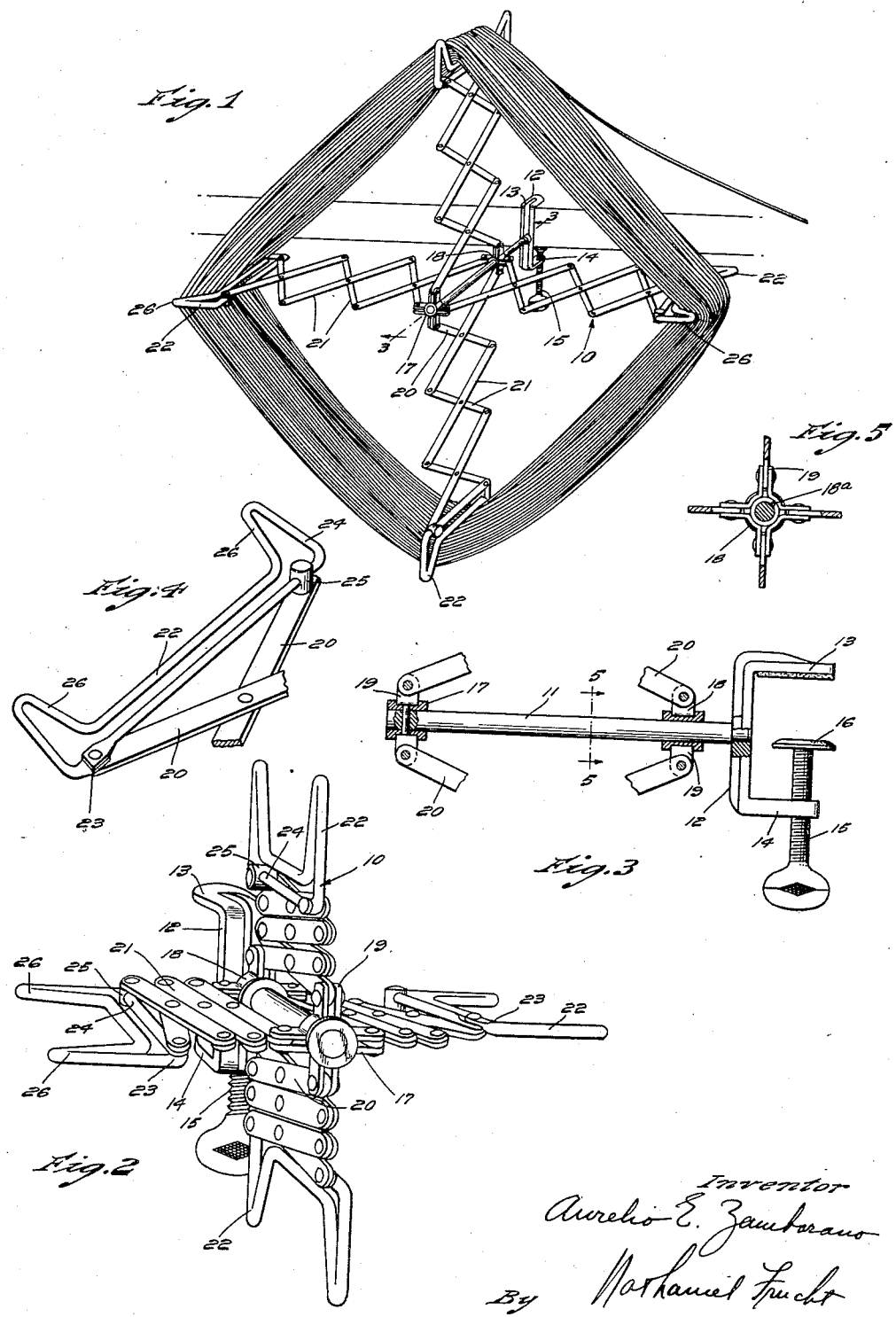
Inventor
Aurelio E. Zambarano
By Nathaniel Frucht
Attorney Oct. 17, 1939.  A. E. ZAMBARANO  2,176,286

HAND WINDING REEL

Filed May 17, 1937  2 Sheets-Sheet 2

Inventor
Aurelio E. Zambarano
By Nathaniel Frucht
Attorney

Patented Oct. 17, 1939

2,176,286

UNITED STATES PATENT OFFICE 2,176,286

HAND WINDING REEL

Aurelio E. Zambarano, Cranston, R. I.

Application May 17, 1937, Serial No. 142,987

2 Claims. (Cl. 242—112)

My present invention relates to winding apparatus, and has particular reference to reels suitable for hand winding.

It is the principal object of my invention to provide a novel construction for hand winding yarn, thread, string, and the like from skeins.

It is a further object of my invention to provide a compact reel which is completely assembled as a unit and which is readily installed for operation.

An additional object is to provide a reel that may be adjusted and set to take any size skein.

Another object of my invention is to provide a reel that may be used as a winding reel for mounting, fishing lines, threads, string, or yarn for drying.

With the above and other objects and advantageous features in view, my invention consists of a novel arrangement of parts more fully described in the detailed description following, in conjunction with the accompanying drawings, and more specifically defined in the claims appended thereto.

In the drawings:

Fig. 1 is an elevation in perspective, showing the reel detachably mounted on a suitable support and in operating position;

Fig. 2 is a perspective view of the reel with the parts in closed position;

Fig. 3 is a detail, partly in section and partly broken away, on the line 3—3 of Fig. 1;

Fig. 4 is a perspective view of one retainer element;

Fig. 5 is a sectional detail on the line 5—5 of Fig. 3;

Figure 6:
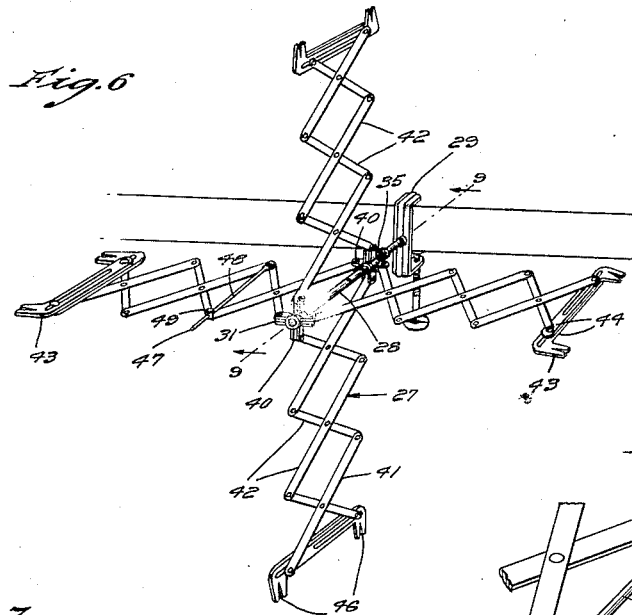
Fig. 6 is an elevation in perspective of a modified reel construction.
Figure 8:
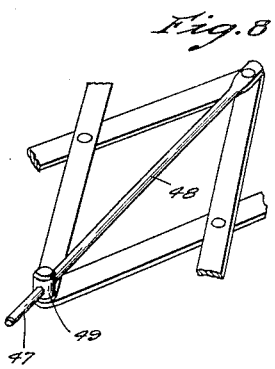
Fig. 8 is a perspective detail showing a handle element.

It has been found desirable to use a vertical reel for hand winding, so as to facilitate mounting and retaining of a skein thereon. I have therefore provided a vertical type reel, having a clamp for detachable securing to a suitable support, such as a table edge, and a central shaft on which the reel may rotate, the reel consisting of a plurality of arms which are preferably of the pantograph type, so as to open equidistantly around the support, the arms each being provided with a skein retainer.

Referring to the drawings, the novel reel 10 comprises a shaft 11 which has a clamp 12 secured at one end thereof, the clamp being U-shaped to provide an upper jaw 13 and a lower jaw 14 in which a manually operable clamp bolt 15 is threadedly mounted, the upper end 16 thereof cooperating with the jaw 13 to detachably mount the reel on a suitable support, as illustrated in Fig. 1. A spider 17 is rotatably fixed to the shaft at the outer end thereof, and a second spider 18 is slidably rotatably mounted on the shaft, the spiders having a plurality of arms 19, see Fig. 5, preferably four in number, to pivotally receive links 20 of pantograph frames 21, see Fig. 1. The spider 18 is split, as at 18a, and frictionally grips the shaft.

The end links of each pantograph frame, see Fig. 4, have a retainer element 22 mounted thereon, preferably made of wire, one end 23 being pivoted on one link, and the other end 24 being slidable in a bearing 25 on the contiguous link, the retainer element being channel shaped as illustrated to provide spaced arms 26 for retaining a skein of yarn or the like therebetween. When a skein is placed on the retainer elements, the pantograph frames are moved until the skein is properly accommodated, and are then free to rotate around the shaft 11 to permit winding of the skein material into a ball.

The parts are preferably of metal, either nonrusting or else heavily plated, the links being of stamped metal, whereby the parts are readily manufactured and assembled. When the parts are in closed position, see Fig. 2, they form a very compact unit, of light weight; when opened and operating, the parts are suitable for any standard size skeins, and the vertical mounting facilitates reeling and prevents slippage or shifting of the skein from the reel retainer elements.

Although I have described a reel suitable for use for hand winding skeins, the construction may be changed to suit any desired reeling purpose. Thus, Figs. 6 to 9 disclose a modified construction suitable for winding fish lines, and particularly suitable for drying fish lines after washing.

Figure 7:
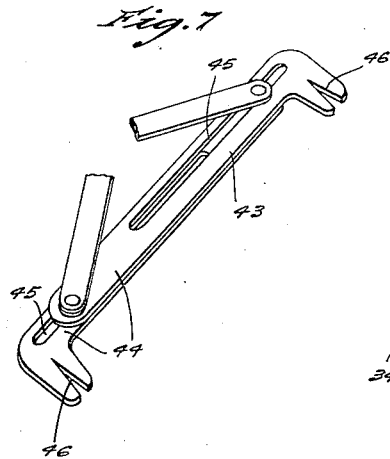
Fig. 7 is a perspective detail of a modified retainer element therefor.
Figure 9:
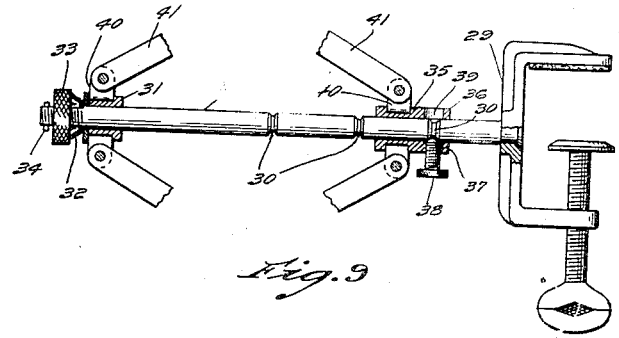
Fig. 9 is a sectional detail, partly broken away, on the line 9—9 of Fig. 6.

The reel 27, see Fig. 6, has a shaft 28 which is provided with a clamp 29 similar in structure to the clamp 12, the shaft having a plurality of V grooves 30. A spider 31 is rotatably mounted on the outer end of the shaft, which is threaded, and a spring washer 32 is pressed against the spider 31 by a knurled nut 33 threaded on the shaft end, to obtain a desired tension for reeling, a pin 34 locking the nut against removal. A second spider 35 is slidably rotatably mounted on the shaft, and has an extension 36 with a bore 37 in which a knurled pin 38 is threaded, to releasably seat in a selected groove 30. The pin 38 is mounted in the spider by providing a bore 39 aligned with the bore 37 so as to seat the pin and then upset it slightly to prevent removal from the bore 37. The spiders have a plurality of arms 40 in which the links 41 of the pantograph frames 42 are pivotally mounted, and a retainer element 43 is provided at the end of each pantograph frame, consisting of two sliding parts 44 each having a slot 45, positioned as illustrated in Fig. 7, so that the parts 44 may slide with respect to each other. The parts 44 are each provided with clefts or notches 46, and are preferably made of a non-metallic substance such as Bakelite or the like, which may be reinforced if desired in the usual manner. A handle 47 is provided, see Fig. 8, by mounting a rod 48 pivotally to contiguous links at one side of a frame, and securing a bearing support 49 at the opposite aligned side, through which the rod slides. The parts are preferably made of sheet metal and wire, as heretofore described, although it is preferred that the parts 44 be of non-metallic material.

When a fishing line is to be wound on the reel, the nut 33 is set to permit free rotation of the reel, one end of the line is caught in a notch 46, and the reel is rotated by means of the handle 47, the size of the reel being set by using a desired groove 30 for the pin 38. The line is thus nicely reeled for drying. To remove the line, the nut 33 is turned to impart a slight tension to the reel, and the line is transferred to the fishing reel.

While I have described specific constructional embodiments of my invention, it is evident that the size and shape of the parts, the number of pantograph frames, the materials used for the parts, and their relative positions, may be changed to suit the requirements for different reels, without departing from the spirit and the scope of the invention as defined in the appended claims.

I claim:

1. In a winding reel, a central shaft, clamp means secured at one end of said shaft, a spider rotatably fixed at the other end of the shaft, a second spider rotatably slidable on said shaft, means comprising spaced notches on said shaft and a cooperating detent element on said second spider for selectively setting said second spider in spaced relation to the first spider, a plurality of pantograph frames secured to said spiders, and means for regulating the resistance to rotation of said first spider, said frames having retainer elements for thread and the like at their outer ends, at least one of said retainer elements having a notch for removably holding a thread end.

2. In a winding reel, a central shaft, clamp means secured at one end of said shaft, a spider rotatably fixed at the other end of the shaft, a second spider rotatably slidable on said shaft, means comprising spaced notches on said shaft and a cooperating detent element on said second spider for selectively setting said second spider in spaced relation to the first spider, a plurality of pantograph frames secured to said spiders, and means for regulating the resistance to rotation of said first spider, said frames having retainer elements for thread and the like at their outer ends, one of said frames having a manually engageable handle element.

AURELIO E. ZAMBARANO.